US008410954B2

(12) United States Patent
Duffy et al.

(10) Patent No.: US 8,410,954 B2
(45) Date of Patent: Apr. 2, 2013

(54) MOVING AND STATIONARY BODY SYSTEM USING TELEMETRY

(75) Inventors: Brian P. Duffy, Powell, OH (US); Christopher A. Novak, Rochester Hills, MI (US)

(73) Assignee: Honeywell International Inc., Morristown, NJ (US)

( * ) Notice: Subject to any disclaimer, the term of this patent is extended or adjusted under 35 U.S.C. 154(b) by 1439 days.

(21) Appl. No.: 11/935,683

(22) Filed: Nov. 6, 2007

(65) Prior Publication Data
US 2009/0115627 A1 May 7, 2009

(51) Int. Cl.
G08C 19/38 (2006.01)
(52) U.S. Cl. ........... 340/870.3; 340/870.01; 340/870.07; 340/870.16; 700/1; 702/33; 702/41; 73/1.09
(58) Field of Classification Search ............ 340/870.18, 340/870.3, 870.01, 870.04, 870.07, 870.16, 340/870.17; 73/1.09, 862.193; 464/2–48, 464/51–53; 702/41, 1, 33, 85, 94, 127; 700/1, 700/2, 90, 95
See application file for complete search history.

(56) References Cited

U.S. PATENT DOCUMENTS

| | | | |
|---|---|---|---|
| 4,059,005 A | | 11/1977 | Brendel et al. |
| 4,354,190 A * | | 10/1982 | Reschovsky ............. 340/870.18 |
| 4,444,061 A | | 4/1984 | Mathias |
| 5,146,790 A | | 9/1992 | Fish |
| 6,912,911 B2 | | 7/2005 | Oh et al. |
| 6,941,817 B2 | | 9/2005 | King et al. |
| 6,963,992 B1 * | | 11/2005 | Cheng et al. .................. 713/501 |
| 7,095,198 B1 * | | 8/2006 | O'Brien ........................ 318/432 |
| 7,129,660 B2 * | | 10/2006 | Fujita et al. ................... 318/434 |
| 7,454,170 B2 * | | 11/2008 | Goossens et al. ............. 455/41.1 |
| 7,480,709 B2 * | | 1/2009 | Callaghan ..................... 709/223 |
| 2005/0017602 A1 | | 1/2005 | Arms et al. |
| 2006/0081070 A1 * | | 4/2006 | Madni et al. ............. 73/862.325 |
| 2006/0137472 A1 | | 6/2006 | Kim et al. |
| 2006/0284583 A1 * | | 12/2006 | Andrews et al. .............. 318/432 |
| 2007/0024387 A1 * | | 2/2007 | Sandacci et al. ............ 333/24 R |
| 2007/0030162 A1 * | | 2/2007 | Okada et al. .................. 340/682 |
| 2007/0159352 A1 | | 7/2007 | Sahashi et al. |
| 2007/0233415 A1 * | | 10/2007 | Babu et al. ..................... 702/127 |
| 2008/0140890 A1 * | | 6/2008 | Klosters ........................ 710/107 |

FOREIGN PATENT DOCUMENTS
WO   WO 2006/083469 A1   8/2006

OTHER PUBLICATIONS

Honeywell, "Model RTC Thin Profile In-Line Rotary Torque Transducer System," pp. 282-286, prior to Nov. 6, 2007.
Lebow Products Inc., "Model 91276-101—Digital Telemetry Tractor Wheel Torque Sensor," 1 page, May 17, 2005.
Lebow Products Inc., "Model 92002-108—Multi-channel Telemetry Sensor Torque/Temperature," 1 page, May 17, 2005.
Honeywell, "TMS 9000 Rotary Torque Measurement System," pp. 316-319, prior to Nov. 6, 2007.

* cited by examiner

Primary Examiner — Hai Phan
Assistant Examiner — Franklin Balseca
(74) Attorney, Agent, or Firm — Seager Tufte & Wickhem LLC.

(57) ABSTRACT

A moving or rotating body and a stationary body having a wireless communication link with each other. The communication link may involve RF telemetry. The stationary body may provide power in a wireless manner to the rotating body. The moving body may be a rotation sensor for determining torque, speed of rotation, angular position, power and the like. The stationary body may also interact with a processing module via a communication medium. The communication medium may be an Ethernet or an equivalent.

14 Claims, 5 Drawing Sheets

MOVING AND STATIONARY BODY SYSTEM USING TELEMETRY

BACKGROUND

The invention pertains to moving and stationary devices interacting with each other and particularly interacting via a medium. More particularly, the invention pertains to interacting of the devices via a wireless medium.

SUMMARY

The invention is a system of moving and stationary bodies having power and communications provided from one body to another. There may be telemetry between the moving and stationary bodies involving a protocol.

DESCRIPTION

Figure 1:
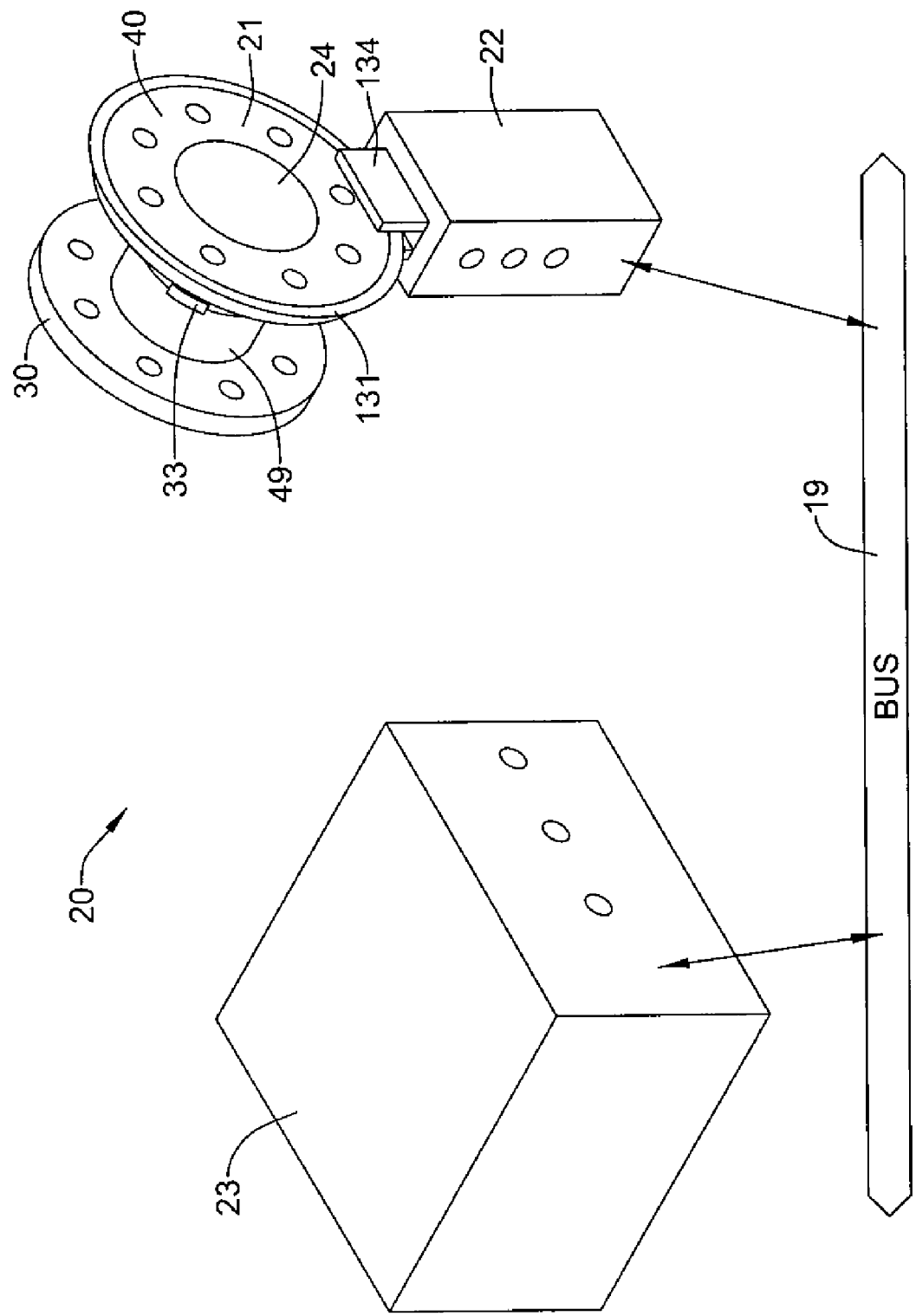
FIG. 1 is a diagram of an illustrative example of a movable sensor using telemetry and/or a communications net between it and stationary devices.

Fast transmission and transfer of data (i.e., low level signals for torque, temperature, angle, and so forth) from a moving body (typically a rotating shaft) to a stationary body or base station may be desirable. This should be achieved while providing the supply of power from the stationary body or base station to the moving body, and without any physical contact between the moving body and any stationary components of the system.

The present system may be a combination of mechanical hardware devices, electronic hardware, firmware and software that includes RF wireless telemetry. "Present" refers to the present invention of this application. Power may be provided to a moving body (i.e., mechanical hardware, typically in the form of a rotating sensor), in addition to providing two-way transfer of data between a stationary body and the moving body, utilizing telemetry techniques combined with air gap transformer techniques. The basic elements of the system may include mechanical hardware in the form of a moving body, a rotor electronics module (i.e., RTE) which is located on the moving body, a rotating antenna which is part of the moving body, a caliper coupling module (i.e., CCM) which is part of or remote from the stationary body or base station, and a signal processing module (i.e., SPM) which is part of the stationary body or base station. Other elements may be part of the system.

A basic element of the present system may include use of an industrial Ethernet as the communications medium to the caliper coupling module, from the signal processing module. In addition, the use of the Ethernet may facilitate an easy setup and monitoring of the caliper coupling module, and ultimately data from the moving (or movable) body.

The present system may allow a user to provide power to a number of devices on the moving body and simultaneously allow the user to gather data from the number of devices on the moving body for subsequent processing within the stationary body or beyond the latter body. The system may include a device or devices on the moving body, a device or devices on the stationary body and a way of transferring power and data between them. To operate the system, the user may place the stationary body in close proximity to a moving body and provide power in a wireless manner to the moving body, such as an indefinitely rotating body. Any devices on the moving body may then be excited by received power and begin to communicate with the stationary body utilizing telemetry techniques along with air gap transformer techniques.

Designed primarily to solve the problem of data capture from rotating shafts, a telemetry mechanism may use an RF transformer operating at, for example, 66.78 MHz to transfer power across the stationary base-moving body gap and use amplitude shift keying (ASK) digital signal modulation of the same RF carrier to transmit a limited number of codes to the moving body and to receive measurement data from the moving body to the stationary body. The RF carrier with the codes may be demodulated at the moving body. Also, the measurement data may be modulated with ASK on an RF carrier when being transmitted from the moving body. The measurement data may be demodulated at the stationary body. Other kinds of modulation and demodulation may be used.

For transmission between the moving and stationary bodies, the RF carrier frequency and the sidebands surrounding it may be selected so as to fit within the industrial, scientific and medical (ISM) wireless band, although the product is not classified as an "intentional radiator" and does not therefore need to comply with the regulations that apply to radio devices (i.e., RF emissions do need to comply with the relevant electromagnetic compatibility (EMC) regulations).

The data rate between the moving body and stationary body may be 423 Kbits/sec, as an example. This rate may allow the system to be developed for high speed measurement of one parameter or lower speed measurements of multiple parameters (e.g., a MUX version).

The system 20 of FIG. 1 may include several main components, such as a mechanical hardware/sensor in the form of a moving body 21, a rotor electronics module (i.e., RTE) 24 located (centrally or peripherally) on the moving body, a rotating antenna 131 which is part of the moving body, and a caliper coupling module 22 (i.e., CCM) having a stationary antenna 134 proximate to the rotating antenna. CCM 22 may be a part of the stationary body or base station. The system may also include a signal processing module 23 (i.e., SPM) which could be a part of the stationary body or base station 22, or be remote from station or module 22. System 20 may further include toolkit software and an Ethernet communications medium.

Moving body 21 may have two flanges 30 and 40 with a central shaft or tube-like rigid connection piece 49 between them. This central piece 49 may have strain gauges 33 bonded to it for purposes of sensing a torque between flanges 30 and 40. For an application of the system, a power drive shaft may be coupled to one flange and a load driving shaft may be coupled to the other flange.

A telemetry system may be very effective for, but not limited to, a torque measurement task within end-of-line production test equipment, process machinery, and in research and development test cell environments.

The signal processing module (SPM) 23 may use two microprocessors to handle the workload. One processor may handle communication with the moving body, and the other processor may handle communications with analog outputs and the outside world.

Previously, there may have been an RF co-axial cable connection between the SPM 23 (which also includes an RF generator) and a passive CCM 22. Cable length sensitivities and cable damage may result in reliability or other issues; but to avoid these, the present CCM 22 may include an RF generator, a demodulator and essential digital signal processing modules that will allow the CCM to operate as a stand-alone provider of measurement data, using an industrial Ethernet as a communications medium (which can be a key part of the present system). Other communications media such as internet LAN, WAN, and so forth, may be used.

To "future-proof" a core design for a period of five to ten years, an Atmel™ AVR (8-bit) processor architecture of the existing SPM 23 may be replaced by an ARM-7™ (32-bit) processor in the CCM and another one in the SPM, and this should allow the processing of the full 19-bit torque measurement data at a fast acquisition rate of 17,656 samples per second, and should be able to drive multiple output channels (using multiple SPM's driven from a common data stream), each with independent ranging and filtering. The ARM-7™ processor may also handle Ethernet communications without a need for add-on processing modules.

Figure 2:
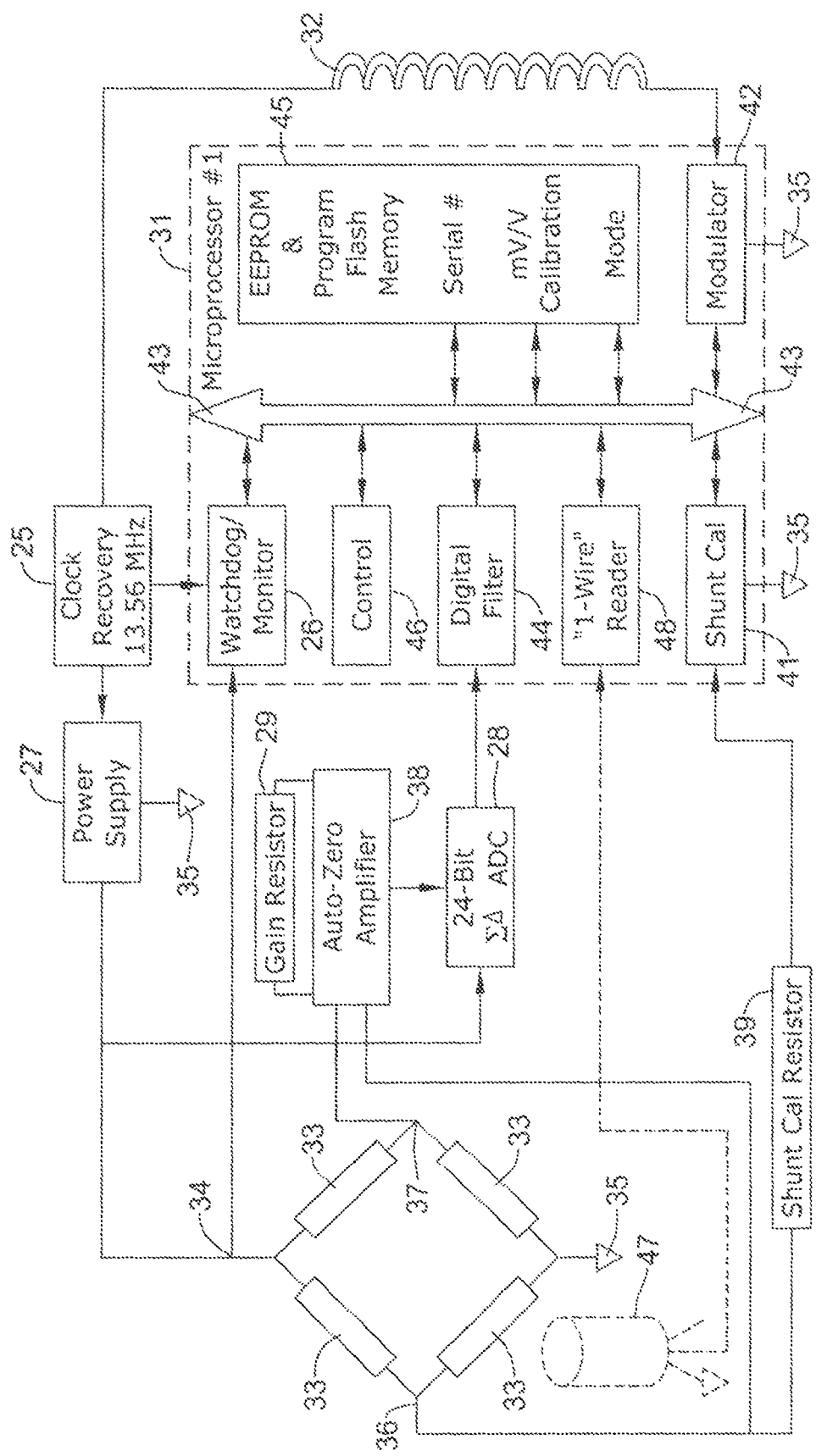
FIG. 2 is a diagram of a rotor electronics module circuit of a movable sensor.

In FIG. 1, the RTE 24 of moving body module 21 might be considered to be sufficiently capable as it is, having a 24-bit low noise front end, and a telemetry protocol to make full use of the RTE 24 capabilities. An addition of a temperature measurement facility may allow temperature compensation to be done digitally at the CCM 22, instead of using an analogue approach within a torque measurement strain gauge bridge. Care may be taken to retain backward and forward compatibility between the CCM 22 and RTE 24 to avoid field service issues. RTE 24 may include revisions to telemetry protocol, including refinements to the message handling routines, to make full use of additional capabilities of the system. RTE 24 may receive and process signals from a shaft torque sensor and/or another kind of sensor. Certain details of RTE 24 are shown in FIG. 2.

The physical layout and presentation of the system 20 may be configured, to allow the creation of a stand-alone sensor system that has a fast digital output (Ethernet) that will allow users to make a direct connection from the caliper coupling module (CCM) 22 to digital data acquisition systems (often a significant part of the present system). For those users that still require analog outputs (i.e., analog and digital), a new style of signal processing module (SPM) 23 may be provided, with the ability to cascade several SPM's to provide an option of providing multiple outputs per data input.

If a market demand exists, then gateway devices may be provided to support specific bus connectivity such as CAN (control area network) or Profibus™. Such gateways may be driven directly from the Ethernet port of the relevant CCM.

A VB6™-based toolkit software may be replaced with a HTML-based toolkit that does not require the loading of software onto the user's personal computer (PC). An advantage of the HTML (HyperText Markup Language) toolkit is that it may be run on any PC that has an Internet Explorer available, and is on the same network as the target CCM 22 or SPM 23. To provide complex features such as wizards may require higher level functionality, such as may be provided by Javascript™, Java Applets™, VBscript™ and DHTML (Dynamic HTML). Such software may need to be run from the CCM or SPM.

The CCM 22 and the SPM 23 may each support a web page interface for configuration and calibration. There should only need to be support for one client. A web interface should be very friendly with menus and graphics to help the user through calibration, and so on. The interface may need to "save" config files and be able to restore later to provide personality transfer.

The present system may gain access to full precision and speed of measurements by a torque sensor by defining the telemetry protocol between the fixed and rotating parts. The RF circuitry may be situated on the caliper coupling module 22 rather than the signal processing module 23, thereby eliminating a need for an RF cable between the caliper coupling module 22 and the signal processing module 23. There may be an input at the caliper coupling module 22 for a standard speed sensor or a speed and angle encoder, thus opening up a possibility of speed and power measurements in addition to torque. A fast Ethernet link may be provided between the caliper coupling module 22 and the signal processing module 23 to allow a user that wants to work in the digital world to have the ability to use the sensor 21 and the caliper coupling module 22 as a stand-alone system without the need for any other components. The SPM 23 could be part of a base station including the CCM 22.

The signal processing module 23 may include or be replaced with a DIN-rail mounted version having multiple expansion slots for modules that are able to provide the higher performance output channels and field bus interfaces. The software "toolkit" may include or be replaced with one having a new "intuitive" style which may run in HTML over the Ethernet link. The replacement could allow setup and monitoring, including fast data logging, over LAN's or direct connections, and provide accessibility by a device that has a web browser. These changes may permit true multi-range and/or multi-channel operation with fully independent settings (e.g., parameter selection, scaling and filtering), and provide a high degree of future-proofing to meet competitive challenges.

In FIG. 1, the caliper coupling module 22 and signal processing module 23 may interconnected via a bus 19. Bus 19 may be or include a communications medium, such as the Ethernet, LAN, WAN, Internet, and so forth. The processing module 23 may use two processors to handle the workload. Expansion of a toolkit of the module 23 may include various facilities that are not part of the module 23 and result in an imbalance of the workload between the two processors which might not be easily corrected. One result is that one of the processors may be running at nearly full capacity and a further toolkit expansion is likely to adversely affect data throughput of the system. The twin processor architecture may be replaced by a single processor design with technology that will allow processing of full 19-bit torque measurement data at a fast acquisition rate of at least about 17,656 samples per second, and permit driving multiple output channels, each having independent ranging and filtering. This single processor may also handle Ethernet without a need for add-on modules.

Temperature measurements in the module 21 may be attained with a Dallas™ type DS18S20 one-wire digital thermometer. The thermometer may be improved with an addition of termination pads to it. The thermometer may have an operating temperature of −55 to +125 degrees Centigrade (C), a 9-bit resolution (0.5 degree C.), and have an accuracy of ±0.5 degree C. over a range of −10 to +85 degrees C. with ±2 degrees C. over the full range. The thermometer may be thermally bonded to the torque sensor.

Condition monitoring by RTE 24 may include feedback from a clock recovery circuit 25 to a watchdog/monitor 26 timer so that a reset can be initiated in the event of a clock corruption (FIG. 2). Additionally, feedback from a recovered power supply 27 may be provided to a (24 bit) $\Sigma\Delta$ analog-todigital converter (ADC) 28 in a microprocessor of a module RTE 24 to permit monitoring of RF coupling efficiency. A provision for an additional gain resistor 29 may be made or be added for use where higher gain is desired or necessary for the module 24.

Telemetry protocol of the rotor telemetry electronics module 24 may be re-defined to allow transmission of a full 24-bit precision measurement, having three modes of operation which include modes of 24-bits at 8,828 Hz, 16-bits at 17,656 Hz and 16-bits at 8,828 Hz (provided for backward compatibility). Calibration may be direct from a millivolt/volt source to facilitate better production flexibility. The module 24 may be equipped to read a Dallas™ one-wire digital thermometer chip 47 with a reader 48. There may be added condition monitoring and a watchdog reset. A capability for measurement of an RF power level received at the module 24 may be added. Also, an automatic reset may be added in case a processor crash occurs. There may be an expanded shunt cal message for the module 24. To avoid disruption in the torque measurement data flow, the temperature and condition results may be appended to a shunt cal message and be available on request only. The module 21 and RTE 24 serial number may also be transmitted for positive identification and for TEDS (transducer electronic data sheet).

For additional details, one may further look at FIG. 2 which is a diagram of the rotor or rotating electronics module 24 of module or moving body 21. Clock recovery module 25 may provide a 13.56 MHz signal to a watchdog monitor 26 of a processor 31, and a signal to power supply 27. The local clock of module 25 may be generated from an external RF carrier.

Power supply 27 may output about 100 mA at 5V DC. The output 34 of supply 27 may be connected to the watchdog/monitor module 26 and to one terminal of a Wheatstone bridge circuit having resistors or strain gauges 33. The resistance of the bridge circuit may be about 300 ohms, but not necessarily limited to 300 ohms. The bridge circuit may be a series of strain gauges 33 attached or bonded to shaft tube 49 (FIG. 1) of system 20. A twisting of the tube may result in a reading from the strain gauges. A terminal of the bridge circuit opposite of line 34 may be connected to a ground 35. The other two terminals 36 and 37 may be connected to an auto-zero amplifier 38. The terminal 36 may also be connected via a shunt cal resistor 39 to a shunt cal module 41. Module 41 may be connected to an internal bus 43 of processor 31 and have a connection to ground 35. The resistor 39 may have a variation about 50 ppm/degree C., but such variation could be another value. Gain resistor 29 may be about 100 ohms and have a variation of about 15 ppm/degree C., but not necessarily limited to 15 ppm/degree C. Resistor 29 could be of another ohm value. Gain resistor 29 may be connected to amplifier 38. An output of amplifier 38 may go to the analog-to-digital converter 28.

Another output of clock recovery module 25 may provide a 6.78 MHz signal to a rotating antenna 32. The other end of antenna 32 may be connected to a modulator module 42. Modulator 42 may be connected to internal bus 43 of processor 31. Information about the magnitude of torque may be provided to modulator 42 so that a modulated signal with the information is emanated from antenna 32 which is rotating with the other electronics in the rotor electronics module.

An output of the ADC 28 may go to a digital filter 44. A filter 44 output may go to bus 43. Information about torque may be in the signal from filter 44 and go to modulator 42. The watchdog/monitor 26 may be connected to bus 43. An EEPROM and program flash memory module 45 may have connections to the bus 43 for a serial number, mV/V calibration and mode. Also, a control module 46 may be connected to bus 43. Also, there may be an optional "1-wire" thermometer 47 with an output to a "one-wire" reader 48 in processor 31. The reader 48 may be connected to bus 43.

The caliper coupling module 22 may be structured to be a self-contained measurement device. RF circuitry of a module 51 (FIG. 3) may be situated in the CC module 22 rather than in the signal processing module 23. Also, the size of the RF circuitry may be small and have an effective heat-sink. The module 23 may be designed for significantly high ambient temperatures. The RF circuitry may be connected via an internal data bus 61 to an ARM™ 32-bit microprocessor 52 having high speed and a sufficiently large memory. There may be a 10/100 Base T Ethernet port 53 for high speed data transfer via a LAN or direct connection to a gateway device, along with an additional RS-232 port 54 for a boot loader and for a handheld indicator. The circuitry may be designed to accept an input from a speed sensor or a speed and angle encoder (with a reference pulse). The circuitry may have inputs and outputs for control and remote activation. For instance, there may be shunt cal initiated by a contact closure across two pins of a connector.

The caliper coupling module 22 may have an Ethernet protocol stack 55 with an HTML toolkit for setup and monitoring. The stack 55 may include a data logging capability to create a data file on a remote PC. There may be a TCP/IP protocol for reliable data transfer at speeds up to about 5000 results per second. IP (internet protocol) addresses and port numbers may be set by a user via the LAN. There may be an optional UDP/IP protocol for use when streaming fast data onto a dedicated line to the user acquisition system.

The caliper coupling module 22 may have a boot loader to allow field updates of software without the need for internal access. Also, the module 22 may have the ability to determine speed and angular position by reading a quadrature input 77 from a speed and angle sensor of the shaft that is being measured for torque. Speed, angle and power measurement data may be made available over the Ethernet link. There may be an ability with module 22 to calibrate directly from an mV/V data input and to convert calibration information to engineering units, such as N-m, N-cm, kgf-cm, ft-lbf, in-lbf, in-ozf, based on an editable conversion table to be supplied by a user.

Figure 3:
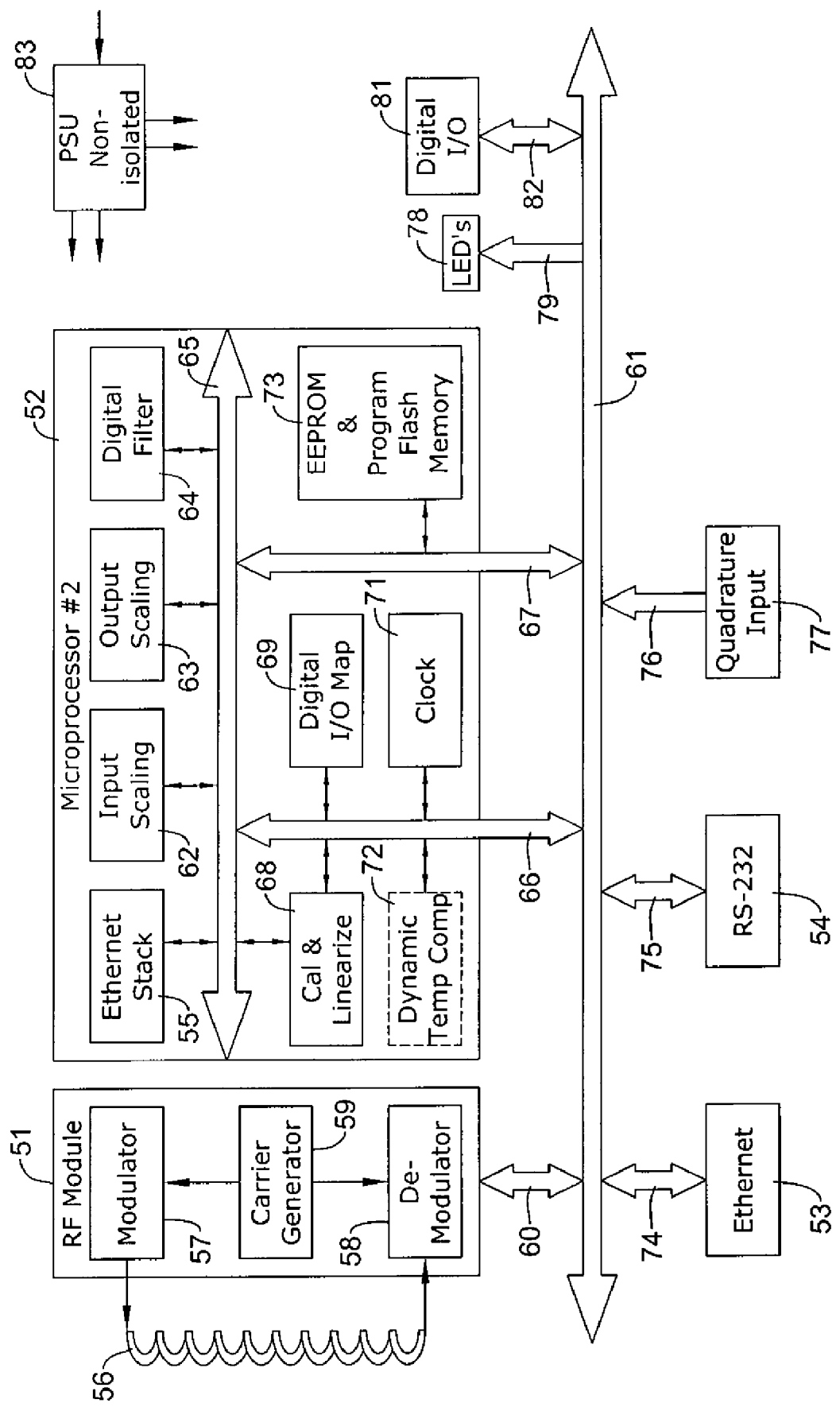
FIG. 3 is a diagram of a caliper coupling module circuit of the movable sensor.

FIG. 3 is a diagram of the circuitry of the caliper coupling module 22. An RF module 51 may be connected to a fixed antenna 56 which is proximate to (e.g., 5 to 6 millimeters, but could be a greater or smaller distance) the antenna 32 of module 21. RF module 51 may have a modulator 57 connected to one end of the antenna 56 and a demodulator 58 connected to the other end of the antenna. Module 51 may also have a carrier generator 59 connected to modulator 57 and demodulator 58. RF module 51 may be connected via a connection 60 to an internal data bus 61.

A processor 52 may have the Ethernet stack 55, input scaling module 62, output scaling module 63 and a digital filter 64 connected to a bus 65 within the processor 52. Bus 65 may be connected to a bus 66 and a bus 67 which are connected to the internal data bus 61. Also in processor 52 are a cal and linearize module 68, a digital I/O map module 69 and a clock 71 connected to bus 66. An optional dynamic temp comp module 72 may be connected to bus 66. An EEPROM and program flash memory module 73 may be connected to bus 67. Stack 55, filter 64, clock 71 and modules 62, 63, 68, 69, 72 and 73 may communicate among themselves and with the internal data bus 61 via buses 65, 66 and 67. Also, the components of processor 52 and RF module 51 may communicate with each other via the bus 61, bus 60 and buses 65, 66 and 67. The components may also communicate outside of the caliper coupling module 22 via the noted buses and buses 74 and 75 to the 10/100 Base T Ethernet port 53 and the RS-232 port 54. The Ethernet port 53 may have the TCP/IP and/or UDP/IP protocol. Also connected to the internal bus 61 may be a bus 76 for conveying a quadrature input from a module 77 in the form of TTL having a frequency range from 0.1 Hz to 200 kHz, but not necessarily limited to that frequency range. The input from module 77 may include signals from speed and angular sensors proximate to the shaft of which the torque sensor is measuring.

There may be LEDs or other kinds of displays and indicators of a module 78 connected to internal bus 61 via a bus 79. Information relating to power, rotor activity, shunt cal, mode and other items may be provided to module 78 from buses 79 and 61 via the other buses connected to bus 61.

There may be a digital I/O module 81 connected to bus 61 via a connecting bus 82. Module 81 may be related to a remote shunt cal, one or more inputs and outputs, as connected by buses 82 and 61 via the other buses connected to bus 61.

Also, incorporated in the caliper coupling module 22 may be a (PSU) non-isolated power supply 83 for providing certain electrical needs of the module.

The signal processing module 23 may be connected to the caliper coupling module 22 via a standard Ethernet cable. In normal use, the Ethernet connection could be via a LAN (not wireless) and communicate using TCP/IP. For a fast mode, a direct Ethernet connection to the sensor may be needed using UDP/IP. Module 23 may have a DIN rail mounting with a 24 volt power supply for easy installation in equipment cabinets. The module may provide an interface for other communication methods. Ethernet or RS-232 may be utilized as a standard. RS-485 and USB may be provided as a standard if desired or needed. One may setup and monitor data over virtually any communications port or via a hand-held display or personal digital assistant (PDA). The module may include four channels of I/O, fully isolated, with LED annunciation, and a TEDS repeater. The module 23 may be used for a remote shunt cal, and external triggering and event monitoring. There may be a removable TEDS module which allows the "personality" to be transferred to another signal processing module for easy field service. "Personality" may refer to the factory-defined defaults and/or the customer-defined defaults.

Standard analog outputs may be provided by the module 23 for the following functionalities, such an analog voltage of 0 to ±10 volts, being non-isolated and with a 2000 Hz bandwidth, and a current loop of 4 to about 20 mA, being non-isolated with a 300 Hz bandwidth. Also, there may be a frequency output which is RS-485 compatible and selectable for 10±5, 60±20, or 60±30 kHz.

Plug-in modules may be provided for module 23 relative to several functionalities. There may be a plug-in having dual channel isolated analog outputs for voltage, a current loop or frequency. There may be a plug-in module for four channel analog voltages of 0 to about 10 volts, for use with a MUX version, and at a non-isolated, 100 Hz bandwidth. A plug-in module may be for RS-485, USB, CANopen, DeviceNet, Profibus, Profinet, and others. There may be a module for a CF (compact flash) card for data logging or special user program storage. A display having, for instance, six digits of a 10 mm height with 7-segment LEDs may be of another plug-in module. There may be one or more additional plug-in modules.

The signal processing module 23 may use configurable IIR (infinite impulse response) or parametric FIR (finite impulse response) filters. The module 23 may use filtering for digital output channels. Individual output modules may be configurable to provide fully independent filtering per channel. However, there may be speed restrictions depending on the number of channels active at any time.

Scaling may be a factor relative to module 23. The torque, speed, angle and power measurements may already be converted into engineering units by the caliper coupling module 22 and delivered digitally to module 23. The module 23 plug-in output modules may be independently scaled to any desired or required range. The effect on accuracy, when using high sensitivities (such as greater than 10:1 of a nominal range), may depend on the stability and repeatability of the sensor and the analog elements of the measurement chain.

As to remote access, the signal processing module 23 may provide a pathway to the module 22. Thus, virtually all of the settings may be maintained from module 23 without a need to know the IP address of module 22. Relative to multiple sensor operations, data from multiple caliper coupling modules 22 could be routed into one signal processing module 23 and delivered to multiple outputs. Restrictions on processing speed may apply in a multiple sensor mode.

Figure 4:
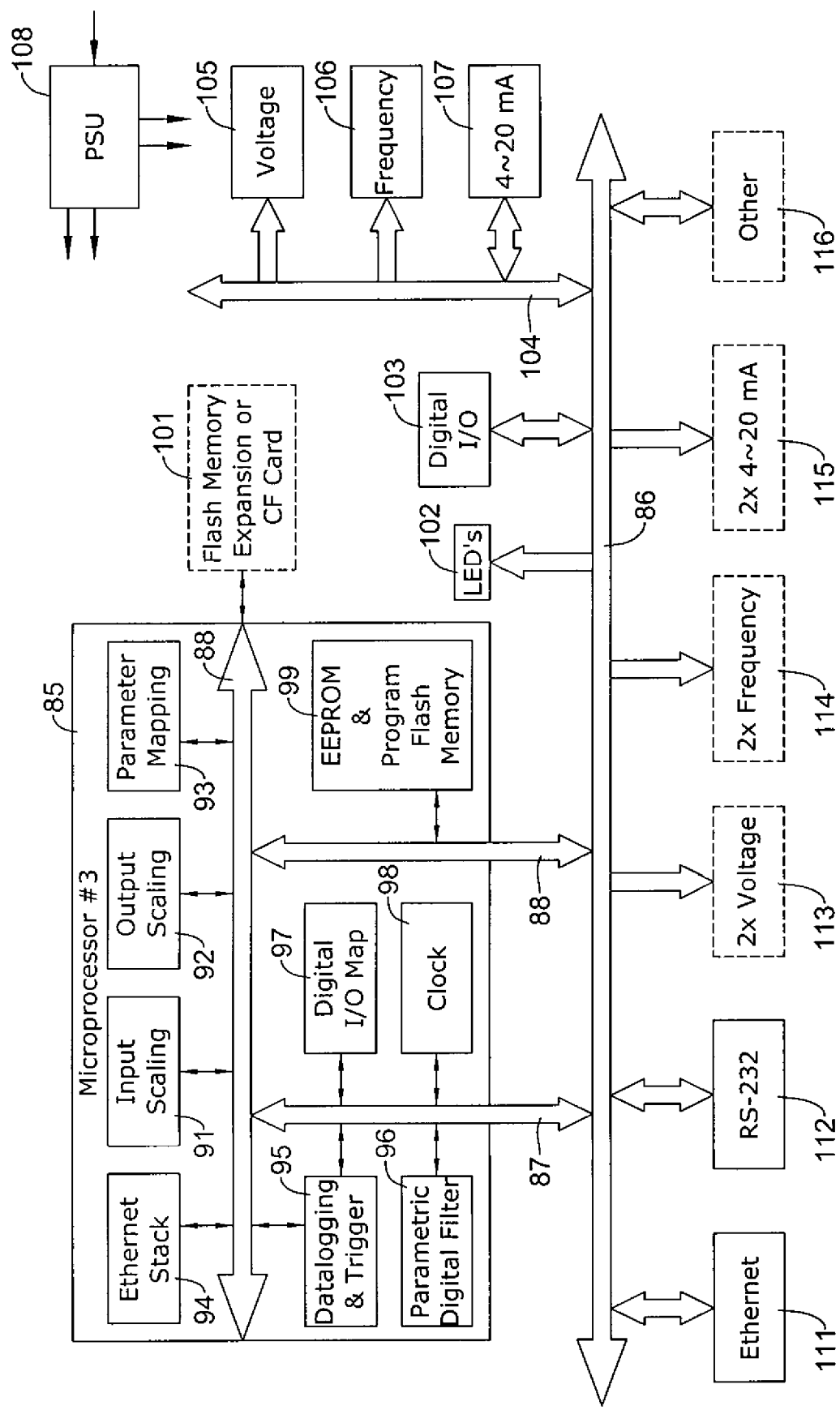
FIG. 4 is a diagram of a signal processing module circuit for the movable sensor.

FIG. 4 is a diagram of the signal processing (SPM) module 23 electronics. There may be a microprocessor 85 connected to a data bus 86 via microprocessor buses 87 and 88. A bus 88 internal to microprocessor 85 may be connected to buses 87 and 88. An input scaling module 91 and an output scaling module 92 may be connected to bus 88. A parameter mapping module 93 and an Ethernet stack 94 may be connected to bus 88.

A data logging and trigger module 95 and a parametric digital filter 96 may be connected to bus 87. Digital I/O map module 97 and clock 98 may be connected to bus 87. An EEPROM and program flash memory module 99 may be connected to bus 88. There may be an optional flash memory expansion or CF card module 101 connected to the internal bus 88 of microprocessor 85.

There may be a set of LED's for indications related to power, rotor activeness, shunt cal and mode in a module 102 connected to data bus 86. Other indications may be provided by module 102. A digital I/O module 103, connected to data bus 86, may provide an interface for TEDS, a remote shunt cal, another input or so and one or more outputs.

Another bus 104 of SPM module 23 may be connected to the data bus 86. There may be a voltage module 105 for a non-isolated 0±10 volts, with bandwidth of 2000 Hz at −3 dB, connected to bus 104. Also connected to bus 104 may be a frequency module 106 for 10±5 KHz, 60±20 or ±30 KHz of a non-isolated RS485 interface circuit. A current module 107 may be connected to bus 104. Module 107 may be for a non-isolated 4 mA to about 20 mA, with 12 mA at a zero torque, and a bandwidth of about 300 Hz at −3 dB. There may be a power supply unit (PSU) 108 for the SPM 23. It may take an input of about 24 VDC or other source value.

Connected to data bus 86 may be an Ethernet module 111 having a TCP/IP or UDP/IP protocols with a 10/100 Base T interface. A module 112 for an RS-232 interface may be connected to data bus 86. Optional modules 113-116 may be connected to data bus 86. Module 113 may be for an isolated dual channel or non-isolated four channel voltage of 0±10 V, with a bandwidth of 2000 Hz at −3 dB. Module 114 may be for an isolated dual channel frequency, 10±5 Kz, 60±20 or ±30 KHz. Module 115 may be an isolated dual channel current, 4~200 mA, 12 mA at zero torque, with a bandwidth of 300 Hz at −3 dB. Module 116 may be for other interfaces such as CAN, DeviceNet, Profibus, USB, I/O, RS485, display, and so forth.

Figure 5:
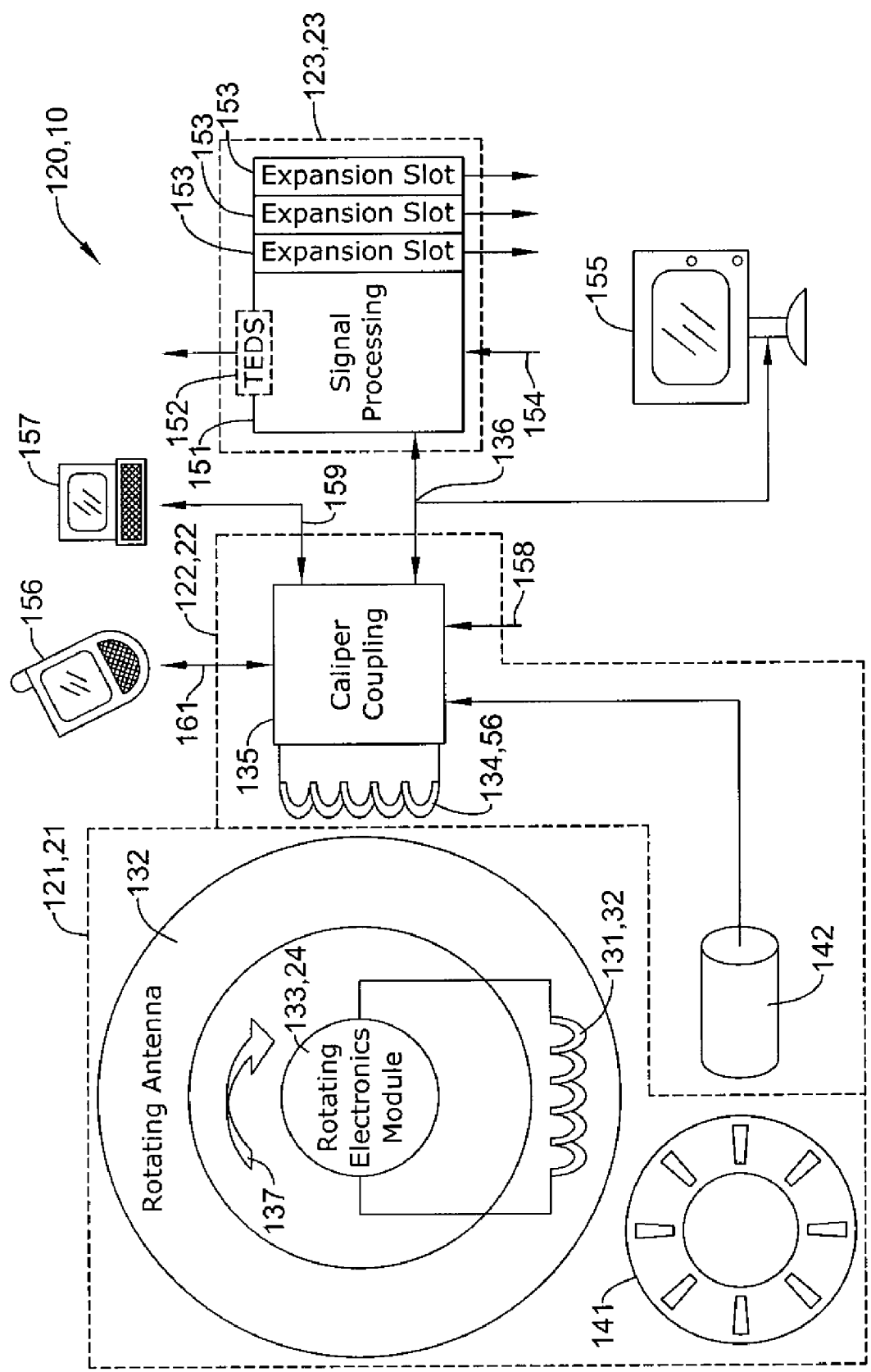
FIG. 5 is a diagram of a system configuration for a movable sensor.

FIG. 5 is a diagram of a rotatable interface system 120. System 120 may have a correlation with system 20 of FIG. 1.

The system 120 may have application to a torque measurement mechanism or other rotating sensing device. The rotating sensor portion 121 of system 120 may include a rotating printed circuit antenna 131. Portion 121 may have a correlation with portion 21 of system 20 in FIG. 1. Antenna 131 may be mounted on a printed circuit 132. Antenna 131 may be connected to a rotating electronics module 133. Module 133 and antenna 131 may have a correlation with module 24 and antenna 32 of FIGS. 1 and 2, respectively. Electronics module 133 may include a sensor or sensors that are designed for measuring rotation-related parameters and/or other parameters. Electronics module 133 may convert sensed and/or measured parameters into telemetry-type of signals which may be emanated by antenna 131 which can be rotating relative to a station, observer or portion 122 associated with the sensed and/or measured parameters. Portion 122 may have some correlation with module 22 in FIG. 1. Another antenna 134 of a caliper coupling portion 122 of system 120 may receive the telemetry-type signals from antenna 131. Also such type of signals may be emanated from antenna 134 to antenna 131. Also, power signals may be emanated from antenna 134 to antenna 131, in that antennas 134 and 131 may be like primary and secondary windings, respectively, of an air gap transformer for transferring power to module 121 for powering the electronics module 133. Antenna 134 may have a correlation with antenna 56 in FIG. 3. The distance between antennas 131, 32 and 134, 56 may be an air gap of a significant amount up to 5-6 mm. However, the air gap may be more or less than 5-6 mm. Antenna 131, 32 may be as much as 6 inches from the main body of the CCM 122, 22 during the transmission of signals and power between them.

Certain signals to and from antenna 134 may be processed and provided, respectively, by a caliper coupling module 135. A module 135 of CCM 122 may have a processor and associated electronics for signal conditioning and for providing signals on a data bus or Ethernet 136 which is connected to a signal processing portion 123 of system 120. Portion 123 may have some correlation with SPM 23 of FIG. 1. Twenty-four volt DC power 158 may be provided to module 135. Other types of power (such as other voltages whether DC or AC) may be used instead.

Processing module 123, 23 may be at a location significantly remote from the coupling portion 122, 22. Processing module 123, 23 may also provide signals to coupling module 122, 22. Module 122, 22 may, in turn, condition the signals for emanation in a wireless fashion, as noted herein, to the moving body 121, 21.

Body 121 may additionally have a wheel-like device 141 that rotates along with the rotating antenna 131, printed circuit 132 and electronics module 133. Device 141 may rotate at the same or different speed as that of components 131, 132 and 133. A sensor 142 of module 122 may be proximate to device 141 for purposes of obtaining signals having speed and angle information of device 141 and in turn similar information about components 131-133. Even though an arrow 137 in portion 121 may indicate clockwise rotation of the components 131-133, such rotation may instead be counterclockwise, oscillatory, or a combination of various kinds of motion and non-motion.

Signals from sensor 142 may go to the caliper coupling module 122 portion 135 for conditioning to be sent via the data bus or Ethernet 136 to a signal processing portion 151 of module 123. Portion or processor 151 may process the speed and angular information signals. Also, in conjunction with these signals, rotation sensor signals from portion 135, antennas 134 and 131, and electronics module 133 may be processed and analyzed by processor 151. Processor 151 may have a plug-in TEDS "personality" device 152 for easy field servicing. Processor 151 or module 123 may have expansion slots 153 as needed. Twenty-four volt DC power 154 may be provided to module 123. Other types of power (such as other voltages, whether DC or AC) may be used instead.

CCM 122, 22 (portion 135) may have an RS-232 interface for a connection 161 to, for example, an optional PDA 156 for a local display and an on-site setup. The connection 161 to PDA 156 may be that of, for example, wire, optical fiber, RF, IR, and/or other kind of connection. The Ethernet or other net connection 136 may be connected to a setup and monitor 155 with virtually any web browser. Connection 136 may be rather short or as long as several hundred feet. A laptop 157 or computer may be connected to the caliper coupling module 122 (portion 135) via a connection 159. The Ethernet and RS-232 may be provided as a standard for interfacing. Also, RS-485, USB and/or other interfacing may be provided as a standard if desired.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A method of effecting interaction between a moving body and a stationary body, comprising:
providing electrical power to the moving body in a wireless manner from the stationary body;
receiving data in a transmission from a sensor of the moving body in a wireless manner to the stationary body;
providing a telemetry protocol for the transmission of data between the moving body and the stationary body;
processing the data with a processor of the moving body;
providing feedback from a power supply to an A-D converter in the processor of the moving body; and
monitoring an RF coupling efficiency between the moving body and the stationary body.

2. The method of claim 1, wherein the telemetry protocol comprises least a 24-bit precision measurement with one or more modes of operation.

3. The method of claim 1, further comprising providing an automatic reset when a crash of the processor of the moving body occurs.

4. The method of claim 1, further comprising providing feedback from a clock recovery circuit to a watchdog timer in the event of a clock corruption in the processor of the moving body.

5. The method of claim 1, further comprising obtaining torque, speed or angular information from the data in the transmission from the sensor of the moving body.

6. The method of claim 5, further comprising determining the speed or angular position information of the moving body in the data of a transmission from a quadrature output of the sensor of the moving body.

7. The method of claim 1, further comprising:
measuring a temperature of the moving body; and
providing temperature compensation of data in the transmission from the moving body.

8. A method of effecting interaction between a moving body and a stationary body, comprising:

providing electrical power in a wireless manner from the stationary body and recovering that wirelessly provided electrical power with a power supply on the moving body;

receiving data in a transmission from a sensor of the moving body in a wireless manner to the stationary body;

providing a telemetry protocol for the transmission of data between the moving body and the stationary body;

processing the data with a processor of the moving body;

providing feedback from the power supply to an A-D converter in the processor of the moving body; and monitoring, based on the feedback from the power supply, an RF coupling efficiency between the moving body and the stationary body.

9. The method of claim 8, wherein the telemetry protocol comprises least a 24-bit precision measurement with one or more modes of operation.

10. The method of claim 8, further comprising providing an automatic reset when a crash of the processor of the moving body occurs.

11. The method of claim 8, further comprising providing feedback from a clock recovery circuit to a watchdog timer in the event of a clock corruption in the processor of the moving body.

12. The method of claim 8, further comprising obtaining torque, speed and angular information from the data in the transmission from the sensor of the moving body.

13. The method of claim 12, further comprising determining the speed and angular position information of the moving body in the data of a transmission from a quadrature output of the sensor of the moving body.

14. The method of claim 12, further comprising:
measuring a temperature of the moving body; and
providing temperature compensation of data in the transmission from the moving body.

\* \* \* \* \*